(12) United States Patent
Johansson et al.

(10) Patent No.: US 6,480,505 B1
(45) Date of Patent: Nov. 12, 2002

(54) BATCHED FAIR EXHAUSTIVE POLLING SCHEDULER

(75) Inventors: Per Johansson, Hagersten (SE); Niklas Johansson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/455,172

(22) Filed: Dec. 6, 1999

(51) Int. Cl.[7] ................................................. H04L 12/28

(52) U.S. Cl. ...................................... 370/449; 370/329

(58) Field of Search ................................. 370/431, 449, 370/329, 346; 455/450

(56) References Cited

U.S. PATENT DOCUMENTS

| | | | |
|---|---|---|---|
| 5,051,984 | A | 9/1991 | Mostafa et al. |
| 5,056,085 | A | 10/1991 | Vu |
| 5,065,399 | A | 11/1991 | Hasegawa et al. |
| 5,173,689 | A | 12/1992 | Kusano |
| 5,235,599 | A | 8/1993 | Nishimura et al. |
| 5,719,861 | A | 2/1998 | Okanoue |
| 5,740,366 | A | 4/1998 | Mahany et al. |
| 5,748,611 | A | 5/1998 | Allen et al. |

FOREIGN PATENT DOCUMENTS

| | | |
|---|---|---|
| EP | 0 294233 A2 | 12/1988 |
| EP | 0599764 | 6/1994 |
| EP | 0 715 478 A2 | 11/1995 |
| EP | 0883265 | 12/1998 |
| EP | 0913965 | 5/1999 |
| GB | 2 229 895 A | 2/1990 |
| WO | 9911025 | 3/1999 |
| WO | 9923799 | 5/1999 |

OTHER PUBLICATIONS

Takagi, Hideaki, "Queuing Analysis of Polling Models", ACM Computing Surveys, vol. 20, No. 1, Mar. 1988.

Johansson, Per, et al., "Short Range Radio Based Ad–hoc Networking: Performance and Properties", Proceedings of International Conference on Communications (ICC '99), Jun. 6–10, 1999.

(List continued on next page.)

*Primary Examiner*—Nguyen T. Vo
(74) *Attorney, Agent, or Firm*—Burns, Doane, Swecker & Mathis, L.L.P.

(57) ABSTRACT

A method and apparatus for improving channel utilization and throughput in an ad-hoc wireless communication system is provided. A master unit and one or more slave units are coupled to a shared communication channel having at least an uplink (UL) channel and a downlink channel (DL) for each master unit-slave unit pair. A group of active nodes is established corresponding to slave units having UL and/or DL data associated therewith for transfer. The group of active nodes may be polled according to Fair Exhaustive Polling (FEP) and information alternately transferred on a TDD. Accumulated information may be transferred in a batch and feedback information collected and used to adjust polling. One or more links may be identified as lossy links due to increased Bit Error Rate (BER) and accompanying information loss resulting in lower throughput. Virtual active nodes added to the group of active nodes to compensate therefor. A transmission parameter such as number of retransmissions may be evaluated against a predetermined threshold to identify lossy links. If lossy links improve, virtual active nodes may be removed from the group of active nodes. Information associated with the one or more slaves units may be circuit switched synchronous information or non-circuit switched asynchronous information. Feedback information such as timeout information associated with the slave units may be evaluated. If a time out signal associated with a slave unite is received the slave unit may be scheduled for polling responsive to the time out signal.

18 Claims, 4 Drawing Sheets

OTHER PUBLICATIONS

"Specification of the Bluetooth System", Bluetooth SIG, vol. 0, Jul. 24, 1999; pp. 35–40 and pp. 121–122.

Albrecht, M.,et al., "IP Services over Bluetooth: Leading the Way to a New Mobility", Proceedings of the Conference on Local Computer Networks, Oct. 1999.

Tode, H., et al., "A Routing Method Using a Tunable Cost Function to Obtain Required Communication Quality and Performance", Electronics and Communications in Japan, Part 1. vol, 81, No. 5, 1998.

Haartsen, J., "Bluetooth—The Universal Radio Interface for Ad Hoc, Wireless Connectivity", Ericsson Review No. 3 (1998), pp. 110–117.

Copy of European Search Report issued on Jun. 5, 2000.

BATCHED FAIR EXHAUSTIVE POLLING SCHEDULER

CROSS-REFERENCE TO RELATED APPLICATION

The present invention is related to the following co-pending applications: Ser. No. 09/455,168 entitled "ROUTE UPDATING IN BLUETOOTH SCATTERNETS", by T. Larsson, et al; Ser. No. 09/696,242, entitled "ROUTE DISCOVERY BASED PICONET FORMING", by T. Larsson, et al; Ser. No. 09/455,460 entitled "BROADCAST AS A TRIGGERING MECHANISM FOR ROUTE DISCOVERY IN BLUETOOTH SCATTERNETS", by T. Larsson, et al; Ser. No. 09/454,758 "INTER-PICONET SCHEDULING ALGORITHM", by Per Johansson, all incorporated herein by reference.

BACKGROUND

The present invention relates to data communication systems for transferring information in packets and more particularly, to scheduling packets in a wireless communications network using polling.

In many conventional packet-oriented data communications networks, the data traffic between units may be controlled by one centralized unit. In such networks, the central unit may be referred to as a server and the remaining units are denoted as clients. All data packets destined for a particular unit or "node" in the network pass through the central node. Moreover, a client node may not generally send data without first being polled by the server unit.

In client-server oriented network architectures, communications channels between a server unit and client units are generally bidirectional and may use either wireline or wireless transmission technology. In the case of a shared channel in either a wireline or wireless network, total data transfer capacity may be shared among one or more clients. A server unit in such a network is therefore responsible for distributing channel capacity among the various clients according to some predefined rule or algorithm. Common methods for distributing channel capacity may include known polling algorithms.

According to typical polling algorithms, the server may address each client in a predetermined sequence. When a client is polled by a server, the polled client has an opportunity to transfer any data which may be queued. If no data is queued, then the server simply moves to the next client in sequence to see if the next client has data for transfer and so on.

One example of a wireless communication system which uses polling to facilitate channel sharing is described in the publication entitled "Specification of the Bluetooth System", published by the Bluetooth SIG, v1.0, Jul. 26 ,1999. The Bluetooth (BT) system is an exemplary technology for ad-hoc networking developed for short range wireless connectivity. Bluetooth is based on a short-range, universal radio link, and it provides a mechanism to form small ad-hoc groupings of connected devices, without a fixed network infrastructure, including such devices as printers, PDAs, desktop computers, FAX machines, keyboards, joysticks, telephones, or virtually any device capable of digital communication.

To better appreciate the operation of a Bluetoothstyle system, the following definitions may be useful.

Piconet: a sub-network that is part of a larger Bluetooth (BT) network, a piconet generally includes one master node and one or more slave nodes. The description of the centrally controlled network in the previous section may be applied generally to a Bluetooth piconet with a series of piconets making up a Bluetooth network.

Bluetooth node: a network node in a piconet which may take on the role of either master or slave. A Bluetooth node may also act as a master and simultaneously as a slave in more than one piconet, however, may be master in only one piconet.

Master: a Bluetooth node which may control all traffic in a piconet and which may act as a server node in accordance with the description of the centrally controlled network given above.

Slave: a Bluetooth node which may be controlled by one master and which may act as a client node in the introductory description above. A piconet may host several slaves simultaneously.

As previously described, Bluetooth systems allow for wireless connectivity between, for example, mobile PCs, phones, digital cameras, proximity detectors, and other portable devices. Bluetooth systems may operate on the unlicensed 2.4 Ghz band which poses some risk of connections collision with 802.11 wireless LANs. Bluetooth systems are nevertheless desirable however due to their low power requirements coupled with the shortness of their range, e.g. up to 10 meters making them useful for interoffice wireless applications. While 802.11 wireless LANs operate with ranges up to several hundred feet. It may be important therefore for Bluetooth systems to be tolerant of possible interference from 802.11 wireless LANs.

A wireless channel in a typical Bluetooth system may use time division duplex (TDD) to achieve a bidirectional link between a master and a slave. When data is transferred on the Bluetooth TDD channel, one packet may first be sent from a master to a slave directly followed by a packet sent from a slave to a master. Moreover, the Bluetooth packet size used in either of the directions may occupy, for example, 1, 3, or 5 slots, where one slot is 0.625 ms wide. The Bluetooth specification, supra, may also support circuit switched traffic on a dedicated logical link denoted synchronous connection oriented (SCO) link, as may typically be used for voice applications. Packets associated with an SCO link may be carried periodically, for example, in every slot, in every second slot, or in every third slot. In contrast, traffic on a dedicated logical link not necessarily associated with circuit switching and more oriented toward data transfer as opposed to voice transfer may be denoted as an asynchronous connectionless link (ACL), In order to control bandwidth utilization and achieve high levels thereof, within, for example, a Bluetooth piconet, a master may control data flow on a communication channel by polling slaves for every data packet sent on the channel in an up-link (UL) direction from the controlled unit to the controlling unit, e.g., slave to master. However, traffic on SCO links is generally sent on an UL without polling in contrast to ACL links where polling is a necessity. A poll from a master node may be in the form of a data packet, thus creating the possibility of a bidirectional data flow on an SCO link at the polling instant if UL traffic is present. In the downlink (DL) direction from the controlling unit to the controlled unit, e.g., master to slave, no polling is generally required to send a packet since slaves are expected to be normally idle unless being polled.

In addition to controlling data flow to and from slaves in most circumstances using polling as described, a master may control packet size used by a slave to achieve precise control of bandwidth and delay in the piconet. Accordingly, control over, for example Quality of Service (QoS) levels, particularly as they relate to delay factors may be achieved. It may be assumed, however, for simplicity in the foregoing and following description unless otherwise noted, that a typical piconet supports best effort (BE) traffic only. Fair distribution of the available resources may nevertheless be applied to the use of polling algorithms even in support of BE traffic.

The particular manner in which a master may poll one or more slaves, is important to ensure proper bandwidth utilization in a piconet. Generally, data traffic within a piconet may exhibit bursty characteristics stemming from, for example, user behavior, application, and protocol mechanisms, e.g., TCP flow control, retransmissions, and the like. For such bursty data traffic, and given that assumption, as described that a Bluetooth piconet supports BE packets, fair distribution of channel resources becomes an important consideration. I may further be important that master-slave pairs having traffic to send be given as much capacity as possible, while maintaining fairness in distribution of channel resources.

Polling algorithms are fairly well known and documented, and several examples may be found in the literature, see, for example, "Queuing Analysis of Polling Models", Hideaki Takagi, ACM Computing Surveys, Vol. 20, No. 1, March 1988. For a better understanding of however, particularly in the context of Bluetooth piconets, short descriptions of three generic polling algorithms are provided herein below.

A first polling algorithm known in the art is the Round Robin (RR) polling algorithm. RR polling represents a simple way of polling slaves in a piconet. In accordance with RR polling, slave nodes may be polled in sequence according to a circular list. During each polling contact by a master node, each slave node may be allowed to send one or more packets the size of which may be fixed at 1,3, or 5 time slots as previously described. Likewise, a master node may send one or more DL packets to a slave node only during a polling contact preferably in a one-for-one exchange as may be associated with, for example, a TDD channel as previously described. Assuming packets having single slot durations, the bandwidth share per master-slave pair, $C_{MSpair}$ in a pico-net with N nodes including a master node and no SCO traffic may be expressed by Equation (1) as follows:

$$C_{MSpair} = \frac{C}{N-1}, \quad (1)$$

where C is the total link capacity in the piconet. If packets occupy more than one time slot, $C_{MSpair}$ could be greater than that given in Equation (1) where $C_{MSpair}$ may now be expressed by Equation (2).

$$C_{MSpair} = \frac{5C}{5+N-2} \quad (2)$$

Equation (2) may be applied to a case where one master-slave pair is active and packets occupying, for example, as many as 5 time slots are used. Simulations have shown that the use of multislot packets may significantly improve the handling of bursty traffic, as may be described in, for example, "Short Range Radio Based Ad-hoc Networking: Performance and Properties", P. Johansson, N. Johansson, U. Körner, J. Elg, G. Svennarp, Proceedings of International Conference on Communications (ICC'99), Jun. 6–10 1999.

A second known polling algorithm may be referred to as Exhaustive Polling (EP). EP allows channel capacity to be dynamically focused to a master-slave pair most in need of greater capacity. EP algorithms conduct a poll of all active slave nodes in a circular fashion similar to RR polling. However, when a slave node having data to transfer, e.g. a non-empty UL queue, is polled by a master, the EP algorithm allows the slave to continue transferring data until the UL queue has been emptied. If new packets are queued prior to emptying a queue, the new packets are also transferred. It is important to note that when conducting EP, for example, in a Bluetooth piconet, the sum of the UL and DL queue contents for a particular master-slave pair should be taken into consideration since the channel is bidirectional. Otherwise, a master node may be polled separately to complete the EP cycle. It should further be noted, however, that EP schemes have inherent fairness problems since a slave having dominant flow of data to transfer may seize the shared channel for a long period of time; since new packets may arrive continuously, the time period may be indefinite.

If no admission control is performed on a per piconet basis, for example, by placing a limit on total traffic load between any particular master-slave pair, traffic streams associated with other master-slave pairs may get starved for indefinite time periods. If admission control is performed, the use of EP schemes may still result in very high delay variations, but will still provide high channel utilization. It should be noted that in order to achieve high throughput, packets should be as long as possible once data is sent to/from a slave. By increasing packet length, overhead per packet may be reduced thus increasing throughput for each master slave pair. Tradeoffs between packet size and packet overhead along with other link requirements may need to be considered to find optimal utilization and throughput. For example, packets occupying up to five time slots may provide good utilization, provided that, for example, SCO links are not present.

A third known polling algorithm may be referred to as Gated Polling (GP). To counter starvation problems associated with EP schemes, Gated Polling (GP) may be used. Polling characteristics similar to EP may be applied generally in GP, however a slave's UL queue may be emptied up to the number of packets that were present when the polling interval began. Thus, new packets queued after polling begins are not transferred until the next polling interval. Subsequent nodes are polled in a similar manner according to a predetermined sequence, e.g. circular.

GP may prevent nodes starvation during bursty traffic conditions, however fairness must be considered on a per burst level, e.g. a node with long bursts queued upon polling will transfer more data than nodes with smaller queue levels. Moreover, overall delay variation may be higher than for EP since data transfer flow is disrupted and delayed until the next polling interval. Since the beginning of the next interval is dependent on queue levels associated with other slave nodes it will occur at a random time.

It should be noted that channel utilization may be lower in GP than in EP schemes since polling after a "gated" flow may result in a sequence of polls of empty queues, or empty poll packets, until the previously gated flow is resumed again during the next poll interval of that queue. As with EP, packets should be as long as possible, e.g. occupy as many time slots as possibly, once data is sent from a queue.

Although some shortcomings of the above described and well known polling schemes have been indicated in terms of delivering efficient and fair service to various slave nodes in a network, several additional problems arise when contemplating which polling algorithm is best suited for use in a Bluetooth system.

A first problem may arise in that it may be possible for some slave units to have delay tolerance requirements which affect the maximum time between two successive poll intervals. Accordingly, any polling algorithm used must ensure that nodes having such delay tolerance requirements are serviced by a master unit within the required time limits.

A second problem may arise in that additional traffic types other than BE traffic may generally be controlled by the master unit. For example, data packets carrying information for circuit emulation services or network management may be handled by a master unit. Accordingly, any polling algorithm used in such a situation must allow transmission of a diversity of packets types in accordance with the requirements unique to each particular service which means that assumptions related to BE transmission may not be valid when different data types are being handled.

A third problem may arise in that a delay may exist between a point in time when a master unit decides to poll a particular slave unit and the point in time when the poll is actually conducted. Usually, this delay is seen as the delay between when a polling instant actually begins at the master and when a polling packet is sent to, or received at the slave unit. Such a delay may be the result of batched information exchange, e.g. pre-scheduling a certain number of packets before actually being queued at the master unit's transceiver. Such a delay gives rise to cumulative delay in that an ultimate reaction by a master unit based on a delayed response from a slave unit will also be delayed. For any polling algorithm used in such a situation polling delay could mean that a master must handle the corresponding delays in any feedback information originating from the slave units.

It would therefore be desirable to provide a polling method for conducting polling in, for example, a Bluetooth or similar ad-hoc wireless system, which fairly distributed channel access between a master and one or more slave units, and which provides improved channel utilization.

SUMMARY

It is therefore an object of the present invention to provide a method for improving the performance of polling based packet switching communication systems such as Bluetooth piconet systems.

It is a further object of the present invention to improve delay factors by taking into account batched information exchange between a master and one or more slaves.

Therefore, in accordance with one aspect of the present invention, the foregoing and other objects are achieved in a method for improving channel utilization and throughput in an ad-hoc wireless communication system having a master unit and one or more slave units, the master unit configured to control the one or more slave units, coupled with a shared communication channel having at least an uplink (UL) channel and a downlink channel (DL) for each master unit-slave unit pair. The method may have steps including establishing a group of active nodes corresponding to one or more of the one or more slave units having UL and/or DL data associated therewith for transfer; polling the group of active nodes according to Fair Exhaustive Polling (FEP); alternately transferring information between the master and a next slave unit as polled according to FEP. It should be noted that alternately transferring may be as a result of a Time Division Duplex link established therebetween.

In accordance with another embodiment of the invention, information may be accumulated to be transferred to the next slave unit and one or more subsequently polled slave units in a batch, and respective portions the batch of information may alternately be transferred between the next slave unit and the one or more subsequently polled slave units during a polling interval associated with each of the next slave unit and the one or more subsequently polled slave units. Feedback information may be collected regarding the slaves and used to adjust polling.

In accordance with still another embodiment of the invention one or more links associated with the one or more slave units may be identified as lossy links due to, for example, increased Bit Error Rate (BER) and accompanying information loss resulting in a lower throughput. Accordingly, one or more virtual active nodes may be added to the group of active nodes, wherein one or more of the one or more virtual active nodes is associated with the each of the identified one or more lossy links. Virtual active nodes may allow additional polling time to be allocated to lossy links. Such determination may be made by evaluating a transmission parameter against a predetermined threshold for each of the one or more links and wherein if the threshold is exceeded the link is identified as lossy, and wherein if the threshold is not exceeded the link is not identified as lossy. The predetermined threshold may include for example, a retransmission parameter. When the one or more links associated with the one or more slave units are no longer lossy the one or more virtual active nodes corresponding thereto may be removed from the group of active nodes.

In accordance with yet another embodiment of the present invention, information transferred between the master and one or more slaves may be associated with one or more of circuit switched synchronous information and non-circuit switched asynchronous information. It may further be possible to evaluating feedback information associated with the one or more slave units to determine for example whether the UL queue is empty or the like and thus polling may be suspended for such a slave unit. Further, during polling, a time out signal may be received associated with one or more of the one or more slave units. Accordingly the corresponding timed out slave units may be scheduled for polling responsive to the time out signal.

BRIEF DESCRIPTION OF THE DRAWINGS

The objects and advantages of the invention will be understood by reading the following detailed description in conjunction with the drawings, in which.

DETAILED DESCRIPTION

Therefore in accordance with the present invention a method and apparatus are provided which improve performance of a polling based packet switched communication system.

Figure 1:
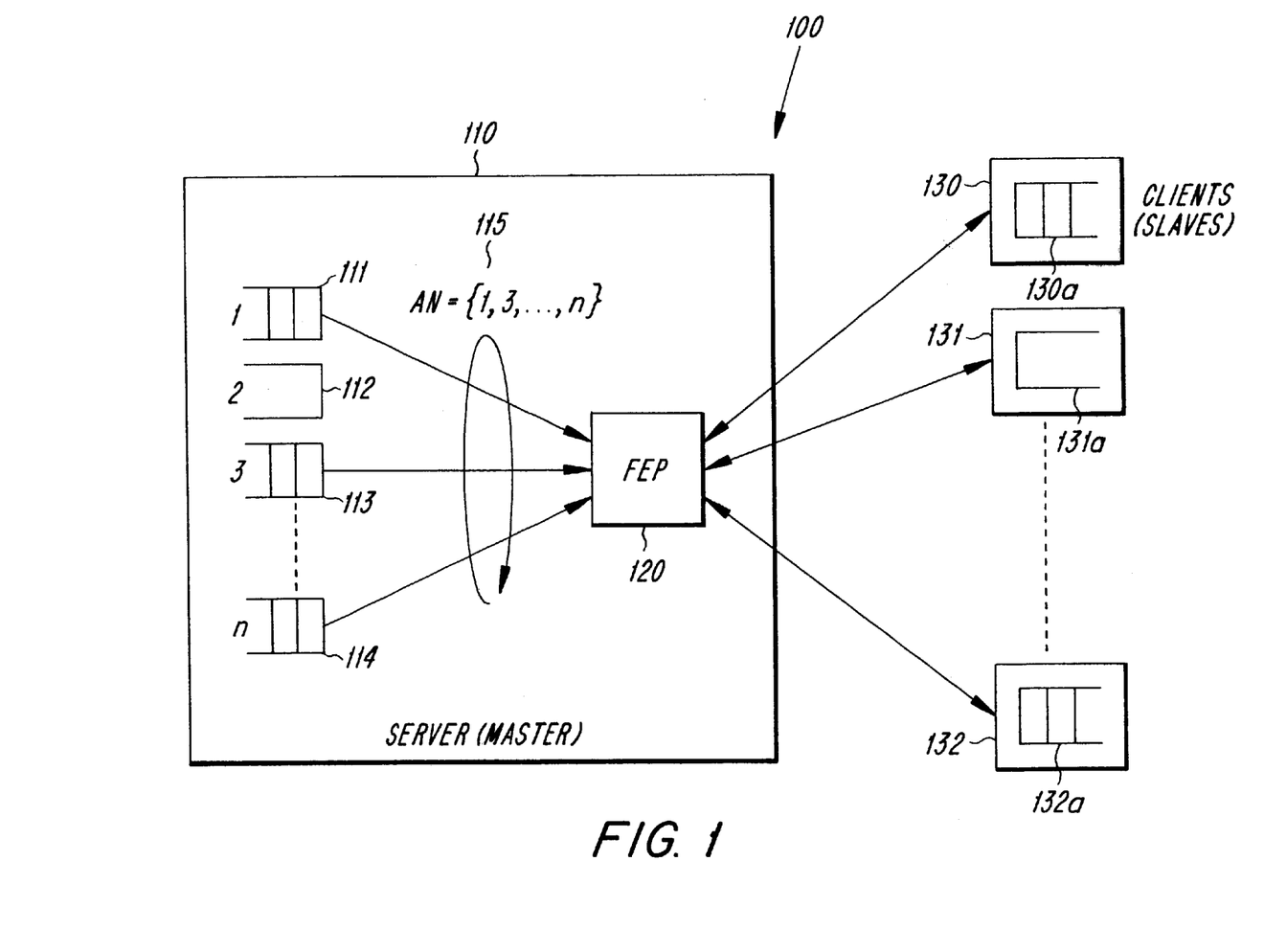
FIG. 1 is a diagram illustrating an exemplary Fair Exhaustive Polling (FEP) embodiment in accordance with the present invention.

In order to introduce fair behavior into a polling scheme that also has high channel utilization, RR and EP polling schemes as described above may be combined in one embodiment of the present invention into a new scheme, which may be referred to herein as Fair Exhaustive Polling (FEP). In accordance with one embodiment of FEP as is illustrated in FIG. 1, communication network 100 is shown having master 110, where FEP 120 may be implemented, and one or more slaves 130–132. A group of active nodes, AN 115, may be maintained containing $N_{an}$ number of nodes which may correspond to, for example, DL queues 111–114 containing one or more packets destined for, for example, slave nodes 130–132 and master node 110. It should be noted that packets destined for master 110 may be queued as appropriate at each slave node 130–132 in UL queues 130a–132a respectively. Slave nodes 130–132 and master node 110 may have non-empty UL queues 130a–132a and DL queues 111–114 respectively and accordingly, a RR scheduling of UL queues 130a–132a and DL queues 111–114 may be conducted by master 110 until exhausted.

To best understand the present embodiment, an example may be presented. When, for example, output queue 112 associated with, for example, a slave node has sent all packets stored therein and the corresponding DL queue is also empty, the node is withdrawn from group AN 115, thus $N_{an}=N_{an}-1$. If all DL queues 111–114 associated, for example, with slave nodes 130–132 and all corresponding UL queues 130a–132a associated with slaves 130–132 become empty, FEP 120 in master 110 may continue to poll in a RR fashion until a node has something to send on either an UL or DL. It should be noted that in order for a node to be removed from group AN 115, both UL and DL queues must be empty. If, for example, an UL queue is emptied before its corresponding DL queue is empty, or vice versa, NULL packets may be sent from the slave node with an empty queue to ensure that something is sent for every interval in the TDD link. If a DL queue empties before the UL queue, the master may send empty POLL packets to fill the link. In the case when FEP 120 is applied to a Bluetooth network, AN 115 may consist of master-slave pairs with packets in either UL queues 130a–132a or DL queues 111–114. In order to add new master-slave pairs into group AN 115, others of, for example, slaves 130–132 may be polled periodically to determine which slave have UL data or if master 110 has DL destined for one or more of slaves 130–132, at which point a slave ID may be added to group AN 115. For a Bluetooth system, a $T_{poll}$ parameter may be individually maintained for each node and used to define the longest polling interval for each particular one of, for example, slaves 130–132. Packet size selection may further be made in order to reduce or minimize overhead, e.g. set packet length equal to data length. It should be noted however that in such a case where a large amount of data is present, and a long packet length is likely to result, $T_{poll}$ should preferably be taken into account. It should be noted that since $T_{poll}$ may vary per node, the node with the shortest or smallest value for $T_{poll}$ will have the most significant effect. Moreover, the number of nodes in group AN 115 will also have an effect since a correspondingly larger "distance" will be created between nodes from a polling standpoint.

Figure 2:
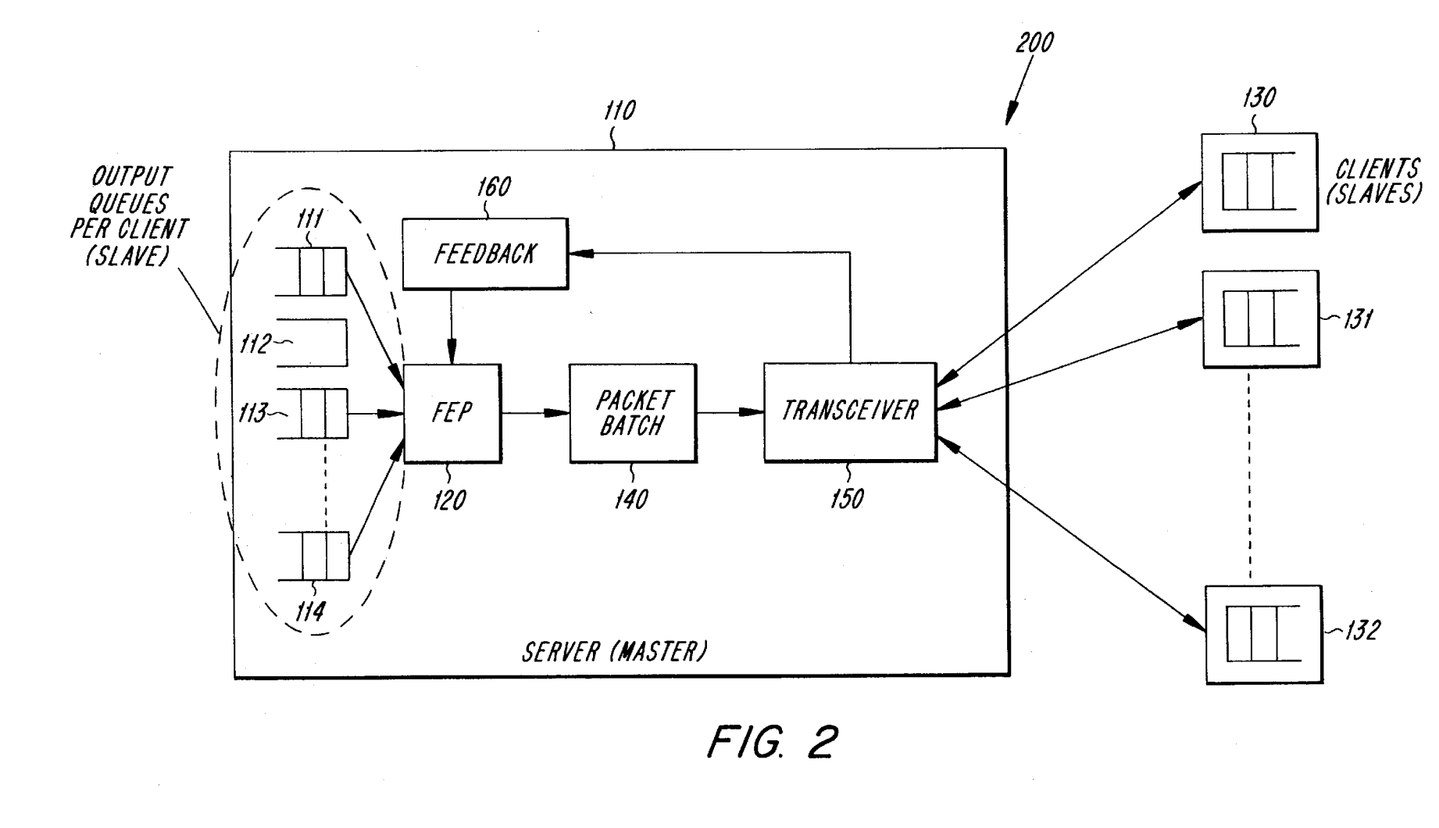
FIG. 2 is a diagram illustrating an exemplary batched FEP scheduling system in accordance with the present invention.

In another embodiment of the present invention, as illustrated in FIG. 2, FEP 120 may be assumed to operate in an environment where packet transmissions may be delayed due to one of many possible implementations or transmission protocols. Instead of scheduling packets in a continuous flow, packet batch 140 may be issued in accordance with the present embodiment for transmission to, for example, slave units 130–132 at a particular interval when, for example, a batch size limit, or similar parameter has been reached. While packet batch 140 is being transmitted by transceiver 150, a next batch may be formed in accordance with, for example, an FEP algorithm, or the like which employs, for example, RR polling as described herein above on, for example, DL queues 111–114. The new packet batch 140 may additionally be based, for example, on feedback received via feedback block 160 which may accordingly include information obtained related to the current packet batch 140 being transmitted and possibly on earlier packet batches 140. For example, feedback block 160 may gather information about the activity level of slave units 130–132. Feedback gathered in this manner by feedback block 160 may allow FEP 120 to decide, for example, which of slave units 130–132 may be regarded as idle or if UL packet size should be increased or decreased. In accordance with the present embodiment, if a Bluetooth piconet system is involved, UL and DL packet size may be adapted to allow simultaneous use of circuit emulation channels, such as SCO channels. As previously noted, short $T_{poll}$ intervals may also place a practical limit on packet size. In addition, bit error rates associated with the communication channel may be at a level where shorter packet sizes may yield a better throughput than longer.

Figure 3:
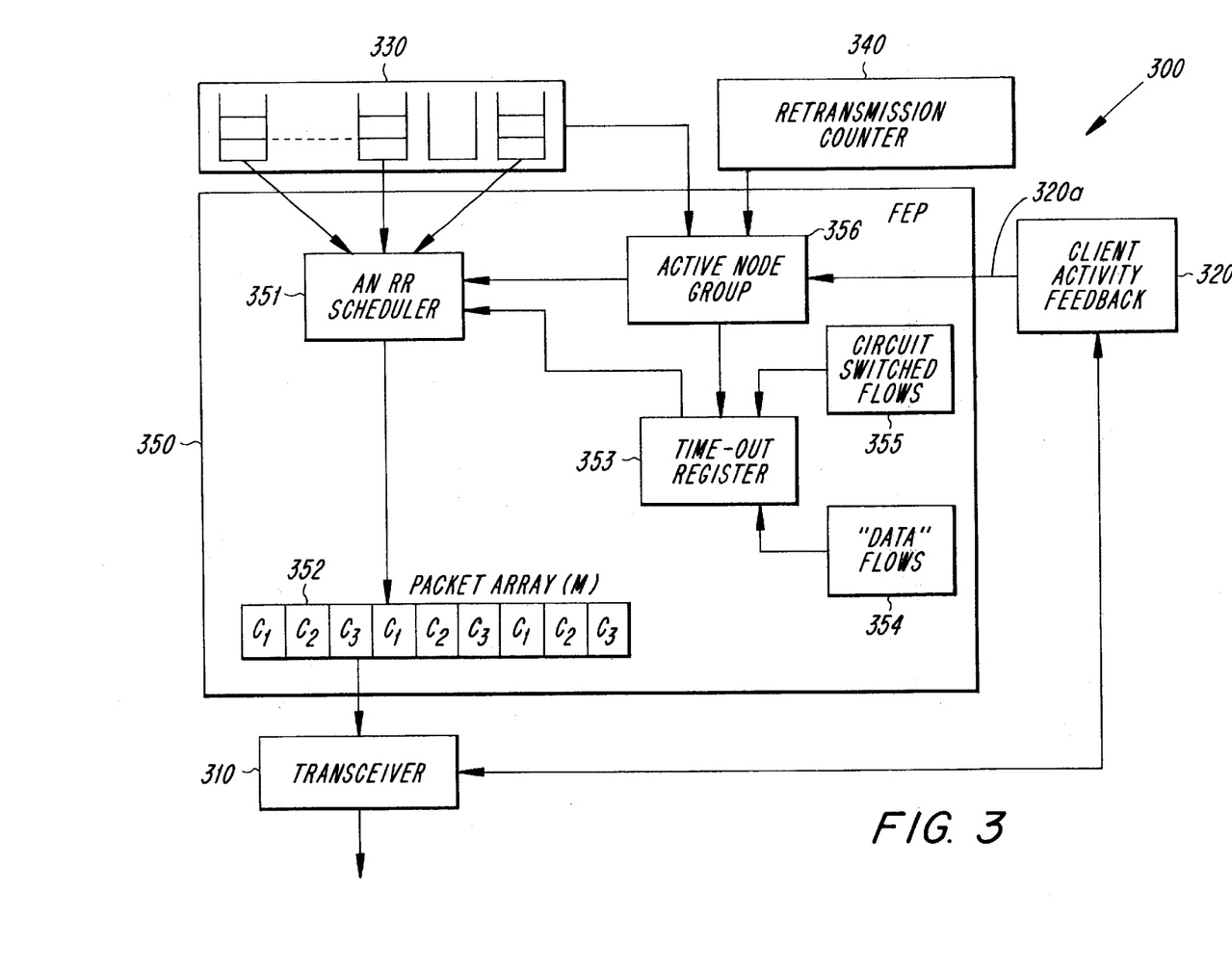
FIG. 3 is a block diagram illustrating portions of an exemplary FEP embodiment.

FIG. 3 is a block diagram illustrating an exemplary communication network 300 with additional exemplary details of FEP block 350 in accordance with yet another embodiment of the present invention. It should be noted that the details described herein below with regard to FEP 350 may also be applied to FEP 120 in the context of the descriptions of FIG. 1 and FIG. 2. In accordance with the present embodiment, data packets from non-empty buffers from, for example, buffer block 330 may be scheduled for transmission in scheduler 351 according to, for example, a RR algorithm as described herein above. In addition, poll packets may sent towards slave units having packets to send in the UL direction as described with reference to previous embodiments. AN group 356, may keep track of master-slave pairs where either a slave or a master has packets to send. In time-out register 353, time-out parameters for slaves that need to be polled within certain periods of time, as might be associated, for example, with special QoS requirements as described herein above, may be stored. In addition, time-out register 353 may initiate input to scheduler 351 to interleave packet exchanges with special QoS requirement slaves when respective time-outs expire. Additional reasons for slave time-outs could be due to delay constrained services as might be posed by, for example, SCO links in Bluetooth systems, represented in the present embodiment by circuit switched flows block 355, or may be due to maximum delay requirements for data flows as might be posed by, for example, ACL links in Bluetooth systems, represented in the present embodiment as data flows block 354. Time outs imposed by data flows block 354 further ensures that slaves not presently included within AN group 356, but, for example, which have data and will become active during the next polling interval, do not become starved due to very long lasting flows fir slaves presently in AN group 356.

It should further be noted that in accordance with the present embodiment, instead of sending packets directly to transceiver 310 on a packet by packet basis as packets are presented for transfer, DL or outbound packets may be stored in packet array 352 before being sent to transceiver 310, e.g. the entire contents of packet array 352 may be exported to transceiver 310 as a packet batch. The size of packet array 352 may preferably be controlled, for example, by a variable, M, in accordance with the present embodiment. Accordingly, transceiver 310 may preferably send and receive packets in packet array 352 without involvement from the FEP. An exception may occur based on the nature of feedback information received from the slaves by way of slave feedback block 320. For example, in a particular circumstance, a slave may need a faster response, which may result in, for example, a new updated packet batch being scheduled by scheduler 351 and sent to packet array 352 for output at transceiver 310 before the previous contents of packet array 352 was exhausted.

Feedback block 320 may further receive information continuously related to the incoming flow of packets from slave units on, for example, corresponding UL channels. In one embodiment, it may be possible for information related to, for example, the amount of data to be sent in an UL session, to be included in a first packet or management packet sent on an UL. It may further be possible for a slave to specify in such a manner, for example, either an absolute amount of time to complete the UL session or the amount of time before it should be polled again. In addition it may be possible for the master to maintain statistics to assist in making determinations regarding polling for non-active or even for active nodes in order to improve polling efficiency. It should be noted that Feedback signal 320a while illustrated as a single line may further include several lines as would be usual in, for example, a data bus, wherein Feedback signal 320a would be a data connection for providing varying degrees of intelligent feedback or feedback related information. Accordingly, feedback signal 320a may be used, for example, by AN group 356, which in turn communicates with scheduler 351 to determine if a slave should use larger or smaller packets based on, for example, the number of unused bytes in packets receive from the slave on the UL channel. In addition, if a slave has no data to send during a polling interval, e.g. as may be indicated by NULL packets in, for example, a Bluetooth system, and there is no DL channel data to send to that slave, FEP 350 may exclude the slave from AN group 356. In order to avoid oscillations, e.g. to avoid a slave being included and excluded from AN group 356 in rapid succession, however, it may be preferable to require that more than one empty or NULL packet to be received from a slave.

Figure 4:
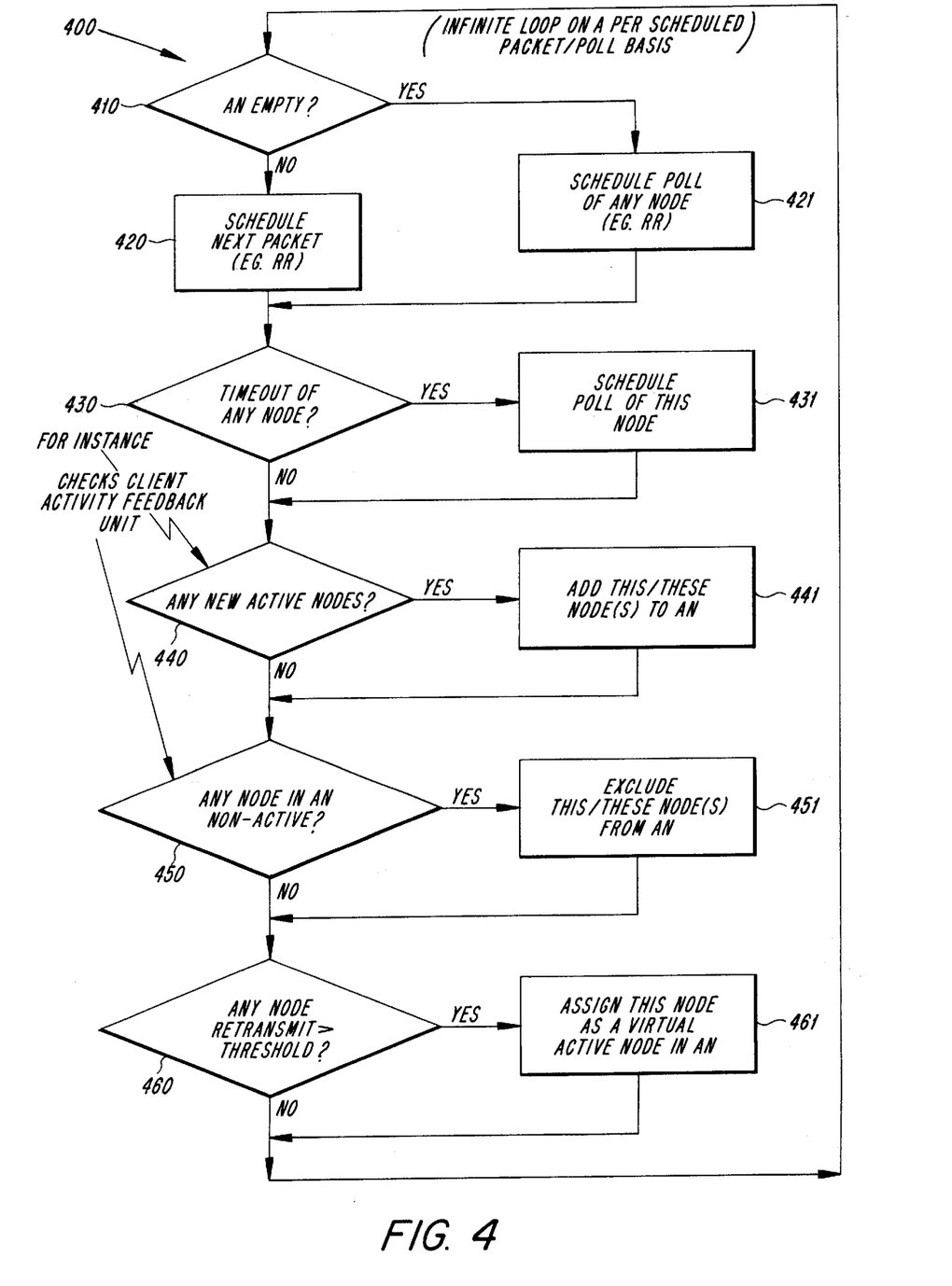
FIG. 4 is a flow chart illustrating exemplary steps in a method in accordance with the present invention.

As is illustrated in FIG. 4, an exemplary method 400 may include steps for accomplishing Fair Exhaustive Polling in accordance with the present invention as follows. An AN group may be established and tested at step 410 to determine if the group is empty. If empty, a poll of any node may be scheduled at step 421, for example, according to a RR polling scheme as described above. If nodes are present in the AN group then the next packet may be scheduled at step 420 in accordance with, for example, a RR method as described. A node timeout, for example, in accordance with the expiration of $T_{POLL}$ may occur in accordance with step 430 whereupon a poll of the timed out node may be scheduled in step 431. If no timeout occurs, new active nodes may be added to the list in steps 441 as they are discovered in step 440. Accordingly, if nodes are discovered to be no longer active, as in step 450, they may be excluded from the AN group in step 451. Finally, it may be desirable to check for lossy links by evaluating, for example, a number of retransmission against a threshold value, as in step 460. Lossy links may arise resulting from local conditions, power levels, interference sources and the like and may result in increasing the BER for the correspondingly affected links. The resulting lossiness may be variable in its severity and may result in a level of information loss as may be calculated, for example, in a signal-to-noise calculation or similar metric as would be known in the art. If such links are found, one or more virtual active nodes may be assigned in the AN group for each lossy link at step 461. It should be noted that the previously described steps may be repeated as part of an infinite loop or continuous process.

As described, bandwidth compensation features for lossy channels may also be included in FEP 350. Bandwidth compensation may allow fairness to be improved between links with different loss characteristics. If, for example, traffic to or from a slave exhibits a high level of packet loss, a correspondingly high amount of bandwidth may be consumed by for packet retransmission. Accordingly, in a pure RR polling scheme, a link with 50 percent packet loss will get only half the amount of packets through while consuming nearly twice the bandwidth compared to a link having similar levels of packet traffic with zero packet loss. To ameliorate this condition, FEP 350 in accordance with the present embodiment, may give lossy links extra bandwidth so as to reach a fair compromise of net throughput among all channels including lossy ones. While AN group is not empty in step 410, channels may be identified as lossy in step 460 as described. An exemplary mechanism to achieve fairness thereafter is to apply Weighted Round Robin (WRR) approach, or more generally a Weighted Fair Queueing (WFQ) where a particular weight may be associated with a lossy link and the degree of weighting corresponds to the relative size of the polling budget dedicated to a particular link. Therefore, in accordance with the present embodiment, some nodes may get polled more often than others in the AN group.

If WRR or WFQ methods are not convenient to implement, one approach which may introduce a higher degree of timing coarseness or granularity, is to include one or more "virtual active node" in the AN group as described with reference to step 461. It should be noted that virtual active nodes may act as place holders in which one or more lossy links can be assigned one or more virtual active nodes effectively increasing the polling budget for the lossy links. Virtual active nodes may be seen as a specific channel only to be used for compensation traffic for lossy links. Virtual Active nodes may further be released as channel characteristics for lossy links improve.

It will be appreciated by those skilled in the art that the present invention may be embodied in other specific forms without departing from the spirit or essential character thereof. For example, while the present invention may typically be associated with Bluetooth systems, the teachings in accordance with the present invention may be applied in other technologies as well. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for improving channel utilization and throughput in an ad-hoc wireless communication system having a master unit and one or more slave units coupled with a shared communication channel having at least an uplink (UL) channel and a downlink channel (DL) for each master unit-slave unit pair, the method comprising the steps of:

establishing a group of active nodes corresponding to one or more of the one or more slave units having UL and/or DL data associated therewith for transfer;

polling the group of active nodes according to Fair Exhaustive Polling (FEP); and alternately transferring information between the master and a next slave unit as polled according to FEP.

2. The method of claim 1, further comprising the steps of:

accumulating information to be transferred to the next slave unit and one or more subsequently polled slave units in a batch; and alternately transferring respective portions the batch of information between the next slave unit and the one or more subsequently polled slave units during a polling interval associated with each of the next slave unit and the one or more subsequently polled slave units.

3. The method of claim 2, further comprising the steps of:

collecting feedback information from the next slave unit and the one or more subsequently polled slave units related to the alternately transferred portions of the batch; and adjusting the polling according to the feedback information.

4. The method of claim 1, further comprising the steps of:

identifying one or more links associated with the one or more slave units as lossy links;

adding one or more virtual active nodes to the group of active nodes, wherein one or more of the one or more virtual active nodes is associated with the each of the identified one or more lossy links.

5. The method of claim 4, wherein the step of identifying further includes evaluating a transmission parameter against a predetermined threshold for each of the one or more links and wherein if the threshold is exceeded the link is identified as lossy, and wherein if the threshold is not exceeded the link is not identified as lossy.

6. The method of claim 4, further including the steps of:

identifying one or more links associated with the one or more slave units as no longer lossy links;

removing one or more virtual active nodes from the group of active nodes, wherein one or more of the one or more removed virtual active nodes is associated with the each of the identified one or more no longer lossy links.

7. The method of claim 1, wherein the information is associated with one or more of circuit switched synchronous information and non-circuit switched asynchronous information.

8. The method of claim 1, wherein the step of polling further includes the step of evaluating feedback information associated with the one or more slave units.

9. The method of claim 1, wherein the step of polling further includes the steps of:

receiving a time out signal associated with one or more of the one or more slave units; and scheduling; the one or more timed out slave units for polling responsive to the time out signal.

10. An apparatus for improving channel utilization and throughput in an ad-hoc wireless communication system, the apparatus comprising:

a master unit;

one or more slave units; and a shared communication channel having at least an uplink (UL) channel and a downlink channel (DL) for each master unit-slave unit pair;

the master unit and the one or more slave units coupled to the shared communication channel, the master device having at least a transceiver, a memory, and a processor, the processor configured to:

establish a group of active nodes corresponding to one or more of the one or more slave units having UL and/or DL data associated therewith for transfer;

poll the group of active nodes according to Fair Exhaustive Polling (FEP); and alternately transfer information between the master and a next slave unit as polled according to FEP.

11. The apparatus of claim 10, wherein the processor is further configured to:

accumulate information to be transferred to the next slave unit and one or more subsequently polled slave units in a batch; and alternately transfer respective portions the batch of information between the next slave unit and the one or more subsequently polled slave units during a polling interval associated with each of the next slave unit and the one or more subsequently polled slave units.

12. The apparatus of claim 11, wherein the processor is further configured to:

collect feedback information from the next slave unit and the one or more subsequently polled slave units related to the alternately transferred portions of the batch; and adjust the polling according to the feedback information.

13. The apparatus of claim 10, wherein the processor is further configured to:

identify one or more links associated with the one or more slave units as lossy links;

add one or more virtual active nodes to the group of active nodes, wherein one or more of the one or more virtual active nodes is associated with the each of the identified one or more lossy links.

14. The apparatus of claim 13, wherein the processor, in identifying is further configured to evaluate a transmission parameter against a predetermined threshold for each of the one or more links and wherein if the threshold is exceeded the link is identified as lossy, and wherein if the threshold is not exceeded the link is not identified as lossy.

15. The apparatus of claim 13, wherein the processor is further configured to:

identify one or more links associated with the one or more slave units as no longer lossy links;

remove one or more virtual active nodes from the group of active nodes, wherein one or more of the one or more removed virtual active nodes is associated with the each of the identified one or more no longer lossy links.

16. The apparatus of claim 10, wherein the information is associated with one or more of circuit switched synchronous information and non-circuit switched asynchronous information.

17. The apparatus of claim 10, wherein the processor, in polling, is further configured to evaluate feedback information associated with the one or more slave units.

18. The apparatus of claim 10, wherein the processor, in polling, is further configured to:

receive a time out signal associated with one or more of the one or more slave units; and schedule; the one or more timed out slave units for polling responsive to the time out signal.

* * * * *